(12) United States Patent
Spector

(10) Patent No.: US 12,500,742 B2
(45) Date of Patent: Dec. 16, 2025

(54) SYSTEMS AND METHODS FOR HOMOMORPHIC ENCRYPTION-BASED TRIGGERING

(71) Applicant: JPMORGAN CHASE BANK, N.A., New York, NY (US)

(72) Inventor: Howard Spector, Street, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 386 days.

(21) Appl. No.: 17/823,718

(22) Filed: Aug. 31, 2022

(65) Prior Publication Data

US 2023/0006819 A1    Jan. 5, 2023

Related U.S. Application Data

(60) Provisional application No. 63/239,335, filed on Aug. 31, 2021.

(51) Int. Cl.
*H04L 9/08* (2006.01)
*H04L 9/00* (2022.01)

(52) U.S. Cl.
CPC ............ *H04L 9/0825* (2013.01); *H04L 9/008* (2013.01)

(58) Field of Classification Search
CPC .............................. H04L 9/0825; H04L 9/008
See application file for complete search history.

(56) References Cited

U.S. PATENT DOCUMENTS 11,281,553 B1 * 3/2022 Jain .................... G06F 18/22
2018/0276661 A1 * 9/2018 van Wingerden ... G06Q 20/383
2019/0182216 A1 * 6/2019 Gulak ................. H04L 63/0414
2019/0355059 A1 * 11/2019 Liberman ............. H04L 9/0836
2020/0401705 A1 * 12/2020 Freeman .................. G06N 3/08
2021/0157937 A1 * 5/2021 Van Liesdonk ......... H04L 9/008
2023/0006819 A1 * 1/2023 Spector .................. H04L 9/008

(Continued)

OTHER PUBLICATIONS

Thorpe (Thorpe, Christopher, and Steven R. Willis. "Cryptographic Rule-Based Trading: (Short Paper)." International Conference on Financial Cryptography and Data Security. Berlin, Heidelberg: Springer Berlin Heidelberg, 2012) (Year: 2012).*

(Continued)

*Primary Examiner* — Harris C Wang

(74) *Attorney, Agent, or Firm* — GREENBERG TRAURIG LLP

(57) ABSTRACT

Systems and methods for homomorphic encryption-based triggering are disclosed. According to an embodiment, a method for homomorphic encryption-based triggering may include: (1) receiving, by a backend computer program executed by a backend electronic device and from a computer program for a client, a trigger condition for an event, the trigger condition encrypted with a public key for an organization and an action to be executed in response to the trigger condition being met; (2) receiving, by the backend computer program, a stream of data encrypted with the public key; (3) comparing, by the backend computer program, the encrypted trigger condition to the encrypted stream of data; (4) determining, by the backend computer program, that the trigger condition is met; and (5) executing, by the backend computer program, the action associated with the trigger condition.

20 Claims, 9 Drawing Sheets

(56) References Cited

U.S. PATENT DOCUMENTS

2023/0171083 A1* 6/2023 Nyamwange ......... H04L 9/0894
713/171

OTHER PUBLICATIONS

International Search Report and Written Opinion of the International Searching Authority, dated Dec. 13, 2022, from corresponding International Application No. PCT/US2022/075739.
Nakasumi, Mitsuaki; et al. "Information Sharing for Supply Chain Management based on Block Chain Technology", 2017 IEEE 19th Conference on Business Informatics, pp. 140 149.

* cited by examiner

SYSTEMS AND METHODS FOR HOMOMORPHIC ENCRYPTION-BASED TRIGGERING

RELATED APPLICATIONS

This application claims priority to, and the benefit of, U.S. Provisional Patent Application Ser. No. 63/239,335, filed Aug. 31, 2021, the disclosure of which is hereby incorporated, by reference, in its entirety.

BACKGROUND OF THE INVENTION

1. Field of the Invention

Embodiments generally relate to systems and methods for homomorphic encryption-based triggering.

2. Description of the Related Art

Homomorphic encryption is a complex technology with compelling benefits, including security and privacy. Homomorphic encryption is a form of encryption that allows users to perform operations on encrypted data without having to decrypt the data. The result of the operations are left in an encrypted form, and when decrypted, the decrypted results provide output that is identical to what would be produced had the operations been performed on the unencrypted data. Implementing systems that leverage homomorphic encryption allow an organization to expand the amount and/or types of information that it will share with and receive from others without compromising privacy or risking a data breach.

SUMMARY OF THE INVENTION

Systems and methods for homomorphic encryption-based triggering are disclosed. According to an embodiment, a method for homomorphic encryption-based triggering may include: (1) receiving, by a backend computer program executed by a backend electronic device and from a computer program for a client, a trigger condition for an event, the trigger condition encrypted with a public key for an organization and an action to be executed in response to the trigger condition being met; (2) receiving, by the backend computer program, a stream of data encrypted with the public key; (3) comparing, by the backend computer program, the encrypted trigger condition to the encrypted stream of data; (4) determining, by the backend computer program, that the trigger condition is met; and (5) executing, by the backend computer program, the action associated with the trigger condition.

In one embodiment, the encrypted trigger condition may include the action, and also including decrypting, by the backend computer program, the action using a private key corresponding to the public key.

In one embodiment, the action may be separate from and associated with the encrypted trigger condition.

In one embodiment, the action may be encrypted with the public key, and also including decrypting, by the backend computer program, the action using a private key corresponding to the public key.

In one embodiment, the trigger condition and the stream of data may be further encrypted with a public key for the client.

In one embodiment, the action may be encrypted with the public key for the client or the public key for the organization. The method may also include decrypting, by the backend computer program, the action with a private key corresponding to the public key for the client or a private key corresponding to the public key for the organization.

According to another embodiment, a system may include: a client device executing a client computer program; a backend electronic device for an organization executing a backend computer program; and a streaming data source. The client computer program may encrypt a trigger condition for an event, with a public key for an organization and an action to be executed in response to the trigger condition being met, and may send the encrypted trigger condition to the backend computer program. The backend computer program may receive a stream of data from the streaming data source, may encrypt the stream of data with the public key for the organization, may compare the encrypted trigger condition to the encrypted stream of data, may determine that the trigger condition is met, and may execute the action associated with the trigger condition.

In one embodiment, the encrypted trigger condition may include the action, the backend computer program may decrypt the action using a private key corresponding to the public key.

In one embodiment, wherein the action may be separate from and associated with the encrypted trigger condition.

In one embodiment, the action may be encrypted with the public key, and the backend computer program may decrypt the action using a private key corresponding to the public key.

In one embodiment, the trigger condition and the stream of data may be further encrypted with a public key for the client.

In one embodiment, the action may be encrypted with the public key for the client or the public key for the organization. The backend computer program may decrypt the action with a private key corresponding to the public key for the client or a private key corresponding to the public key for the organization.

According to another embodiment, a non-transitory computer readable storage medium, including instructions stored thereon, which when read and executed by one or more computer processors, cause the one or more computer processors to perform steps comprising: receiving, from a computer program for a client, a trigger condition for an event, the trigger condition encrypted with a public key for an organization and an action to be executed in response to the trigger condition being met; receiving a stream of data encrypted with the public key; comparing the encrypted trigger condition to the encrypted stream of data; determining that the trigger condition is met; and executing the action associated with the trigger condition.

In one embodiment, the encrypted trigger condition may the action, and further including instructions stored thereon, which when read and executed by one or more computer processors, cause the one or more computer processors to decrypt the action using a private key corresponding to the public key.

In one embodiment, the action may be separate from and associated with the encrypted trigger condition.

In one embodiment, the action may be encrypted with the public key, and further including instructions stored thereon, which when read and executed by one or more computer processors, cause the one or more computer processors to decrypt the action using a private key corresponding to the public key.

In one embodiment, the trigger condition and the stream of data may be further encrypted with a public key for the client.

In one embodiment, the action may be encrypted with the public key for the client or the public key for the organization, and further including instructions stored thereon, which when read and executed by one or more computer processors, cause the one or more computer processors to decrypt the action with a private key corresponding to the public key for the client or a private key corresponding to the public key for the organization.

According to another embodiment, a method for homomorphic encryption-based scoring may include: receiving, at a backend computer program executed by a backend electronic device for an organization, encrypted customer data from a plurality of reporting organizations, wherein the customer data is encrypted with a public key for the organization; storing, by the backend computer program, the encrypted in a database; receiving, by the backend computer program, a request for a customer score from one of the plurality of reporting organizations; retrieving, by the backend computer program, the encrypted customer data for the customer; executing, by the backend computer program, a scoring algorithm on the encrypted customer data to generate an encrypted result; and communicating, by the backend computer program, the encrypted result to the requesting organization. The requesting organization may decrypt the encrypted result to obtain the score.

According to another embodiment, a non-transitory computer readable storage medium, may include instructions stored thereon, which when read and executed by one or more computer processors, cause the one or more computer processors to perform steps comprising: receiving encrypted customer data from a plurality of reporting organizations, wherein the customer data is encrypted with a public key for the organization; storing the encrypted in a database; receiving a request for a customer score from one of the plurality of reporting organizations; retrieving the encrypted customer data for the customer; executing a scoring algorithm on the encrypted customer data to generate an encrypted result; and communicating the encrypted result to the requesting organization. The requesting organization may decrypt the encrypted result to obtain the score.

According to another embodiment, a method for homomorphic encryption-based fraud identification may include: receiving, at a backend computer program executed by a backend electronic device for an organization, encrypted customer data from a plurality of participating organizations; applying, by the backend computer program, a machine learning or other processes or algorithms to the encrypted customer data; and outputting, by the backend computer program, the result to one or more of the participating organizations. In one embodiment, a customer identifier in the result may be replaced with a value, such as a token or grouping value, to hide the customer's identity.

According to another embodiment, a non-transitory computer readable storage medium, may include instructions stored thereon, which when read and executed by one or more computer processors, cause the one or more computer processors to perform steps comprising: receiving encrypted customer data from a plurality of participating organizations; applying a machine learning or other processes or algorithms to the encrypted customer data; and outputting, the result to one or more of the participating organizations. In one embodiment, a customer identifier in the result may be replaced with a value, such as a token or grouping value, to hide the customer's identity.

According to another embodiment, a method for homomorphic encryption-based collaborative machine learning may include: receiving, by a backend computer program executed by a backend electronic device for an organization, a machine learning model that may be encrypted with a public key for the organization to train from a third party; encrypting, by the backend computer program, organization data using the public key; training, by the backend computer program, the encrypted machine learning model using the encrypted organization data; and sending, by the backend computer program, parameters for the encrypted machine learning model to the third party.

According to another embodiment, a non-transitory computer readable storage medium, may include instructions stored thereon, which when read and executed by one or more computer processors, cause the one or more computer processors to perform steps comprising: receiving a machine learning model that may be encrypted with a public key for the organization to train from a third party; encrypting organization data using the public key; training the encrypted machine learning model using the encrypted organization data; and sending parameters for the encrypted machine learning model to the third party.

BRIEF SUMMARY OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for homomorphic encryption-based triggering are disclosed. In embodiment, a customer may wish to stage future transactions that will execute based on some trigger criteria without letting the financial institution that will execute the transaction know of the details of the transaction until the transaction is triggered to be executed. For example, the customer may not wish to disclose the target (e.g., a stock), a target price, or a trade amount.

Using a web browser or program, the customer may generate and encrypt one or more trigger conditions using the financial institution's public key and may send the encrypted request to a system that has no access to the private key for storage and processing.

The financial institution may use the same public key to encrypt a stream of data, such as stock tickers, and may send the encrypted data to the encrypted trigger processing service. While the trigger and the stream of data remain encrypted, the encrypted trigger processing service may compare the encrypted trigger to the incoming encrypted stream of data until a trigger is met. Then, the encrypted trigger may be provided to a separate system for processing. for example, the encrypted trigger may be decrypted using the corresponding private key and the transaction may then be executed.

Alternatively, the encrypted trigger may be provided to the customer, who may decrypt the encrypted trigger and provide it to the financial institution for execution of the transaction.

Figure 1:
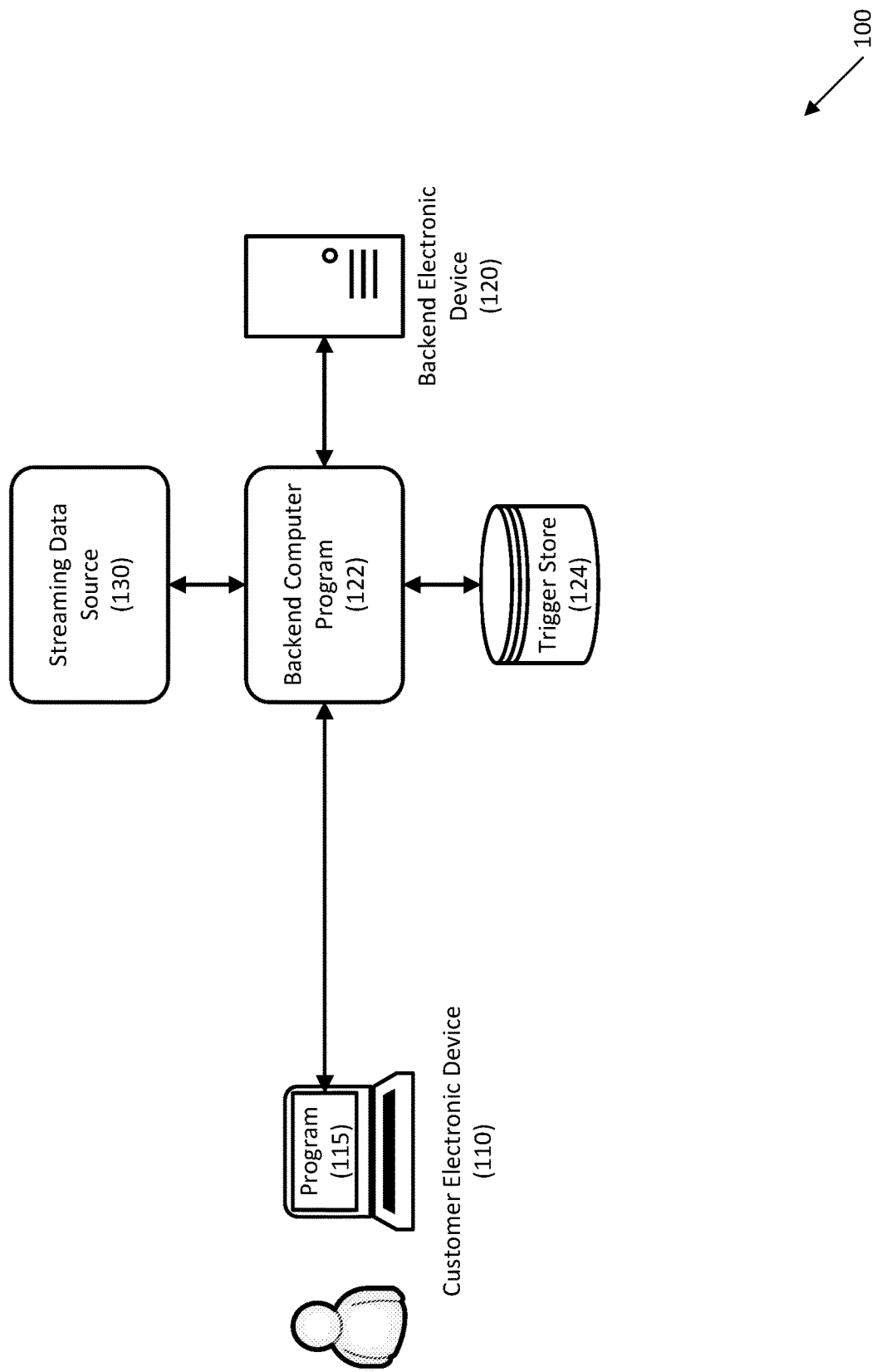
FIG. 1 depicts a system for homomorphic encryption-based triggering according to an embodiment.

Referring to FIG. 1, a system for homomorphic encryption-based triggering is disclosed according to an embodiment. System 100 may include customer electronic device 110, which may execute computer program 115. Customer electronic device 110 may be any suitable electronic device, including computers (e.g., workstations, desktops, laptops, notebooks, tablets, terminals, etc.), smart devices, automated teller machines, kiosks, Internet of Things devices, etc. Program 115 may be a web browser, an application, etc. Using program 115, a customer may set up a trigger that that is encrypted in the browser using the financial institution's public key before submission to the encrypted processing service.

Program 115 may interface with backend computer program 122 executed by backend electronic device 120. Backend electronic device 120 may be any suitable electronic device, including servers (e.g., physical and/or cloud-based), computers, etc.

Backend computer program 122 may provide a public key for an organization, such as a financial institution, to program 115, and may receive encrypted trigger data from program 115. It may store the encrypted trigger data in trigger store 124, which may be any suitable storage.

Backend computer program 122 may also receive streaming data from streaming data source 130. Streaming data may be any data on which a trigger may be conditioned. An example of streaming data source 130 is market data.

Figure 2:
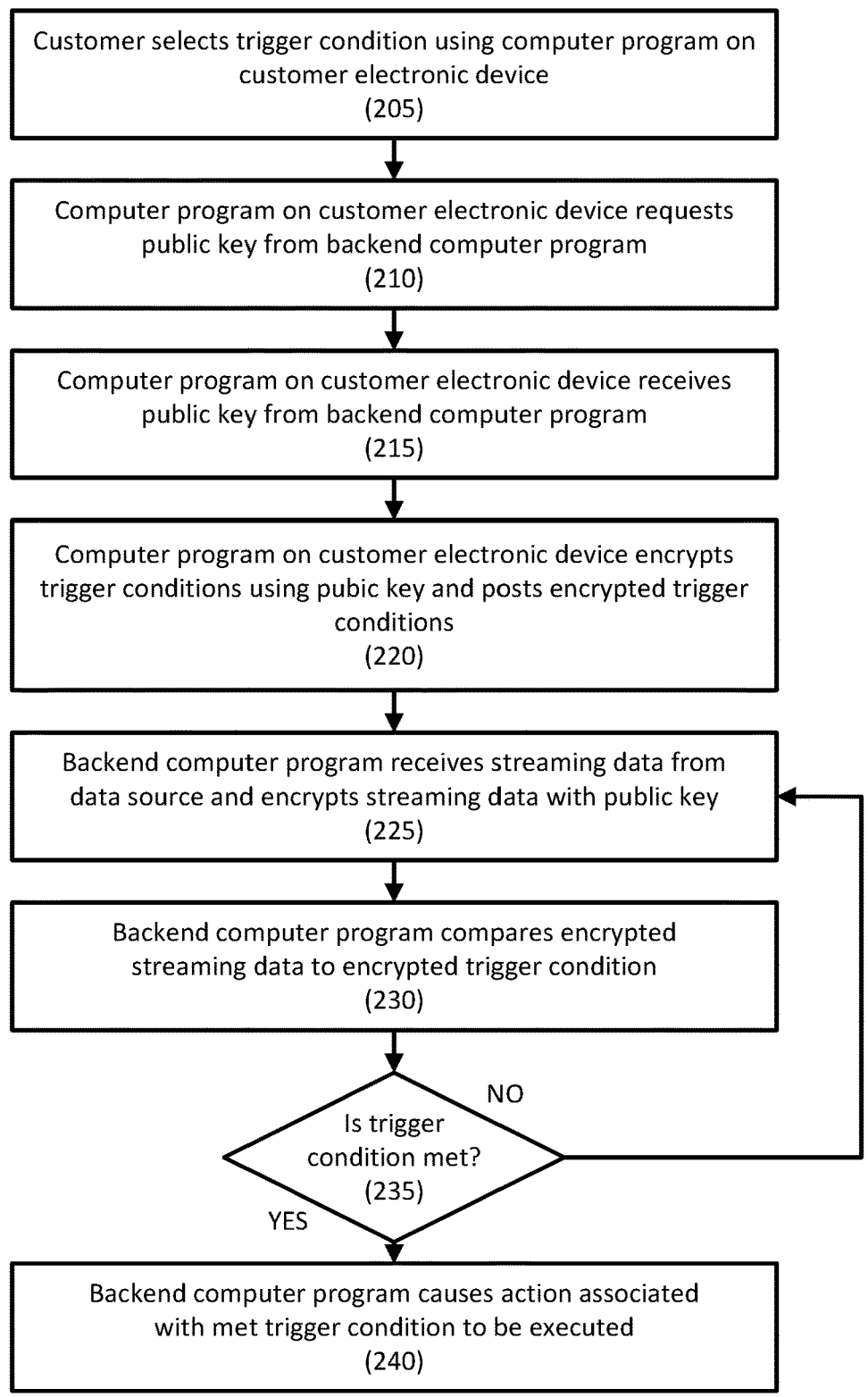
FIG. 2 depicts a method for homomorphic encryption-based triggering according to an embodiment.

Referring to FIG. 2, a method for homomorphic encryption-based triggering is disclosed according to an embodiment.

In step 205, using a computer program on a customer electronic device, a customer or client may select one or more trigger conditions for an event. The trigger condition may be any suitable condition that may be used to cause execution of an action. For example, the one or more trigger conditions may be based on a price (e.g., a price of a security), a change (e.g., a change in value), etc.

In one embodiment, the trigger condition may identify the action to execute when the trigger condition is met.

In another embodiment, the action may be separate from the trigger condition, but may be associated therewith.

In step 210, if needed, the computer program on customer electronic device may requests a public key for an organization, such as a financial institution, a FinTech, a broker, etc. from a backend electronic device for the organization.

In step 215, the computer program on the customer electronic device may receive the public key from backend computer program. For example, a backend computer program executed by the backend electronic device may return or otherwise make the public key available to the computer program.

In step 220, the computer program on the customer electronic device may encrypt the one or more trigger conditions using the public key and may post the encrypted trigger condition(s) to the backend computer program. For example, the computer program on the customer electronic device may send the encrypted trigger condition(s) to the backend computer program, may write them to a distributed ledger, etc.

In one embodiment, the action may also be encrypted with the public key for the organization. In another embodiment, the action may remain unencrypted.

In one embodiment, the backend computer program may store the encrypted trigger conditions(s) and the action (encrypted or unencrypted) in a database. If the action is separate from the encrypted trigger condition, the action may be linked or associated with the encrypted trigger condition.

In step 225, the backend computer program may receive streaming data from a streaming data source and may encrypt the streaming data with the public key.

In step 230, the backend computer program may compare the encrypted streaming data to the encrypted trigger condition(s). The backend computer program may perform the comparison continuously, periodically, or as desired. Because both the streaming data and the trigger condition(s) are encrypted with the same public key, the backend computer program does not need to decrypt the trigger condition(s) to perform this comparison.

In step 235, if the trigger condition is not met, the backend computer program may continue monitoring the encrypted streaming data and comparing the encrypted streaming data to the encrypted trigger condition.

If the trigger condition is met, in step 240, the backend computer program execute the action associated with the trigger condition. If necessary, the backend computer program may decrypt the encrypted trigger condition to identify the action to be executed. In another embodiment, the backend computer program may retrieve the action associated with the encrypted trigger condition and may decrypt the action as necessary. If needed, the backend computer program may also decrypt the encrypted streaming data.

In one embodiment, multi-key homomorphic encryption may be used, and each party (e.g., customer, financial institution, etc.) may encrypt the data using its own public key or the other entity's public key. For example, the customer may encrypt its public key and send it to the organization in its encrypted state, and may also encrypt the trigger condition with its public key and/or with the organization's public key. The organization may encrypt the stream of data with the organization public key.

An example of multi-key homomorphic encryption using on-the-fly multipart fully homomorphic encryption that introduces an evaluation key with the private and public key is described in eprint.iacr.org/2013/094.pdf, the disclosure of which is incorporated, by reference, in its entirety. An example of fully multi-key homomorphic encryption is disclosed in eprint.iacr.org/2019/524.pdf, the disclosure of which is incorporated, by reference, in its entirety.

In one embodiment, organizations may use homomorphic encryption and multi-key homomorphic encryption to share data securely which maintaining internal privacy controls/commitments to customers. For example, a financial institution and a merchant partner may exchange fully encrypted data with each other, and the data may be processed without revealing the underlying data.

In embodiments, an encrypted machine learning algorithm or legacy style hand coded algorithm may process the data in its encrypted state and output to each party an encrypted result set. The parties may then decrypt the result set and may take further actions, such as requesting information from the other side to target offers, advertisements, or learn more about the customers.

Figure 3:
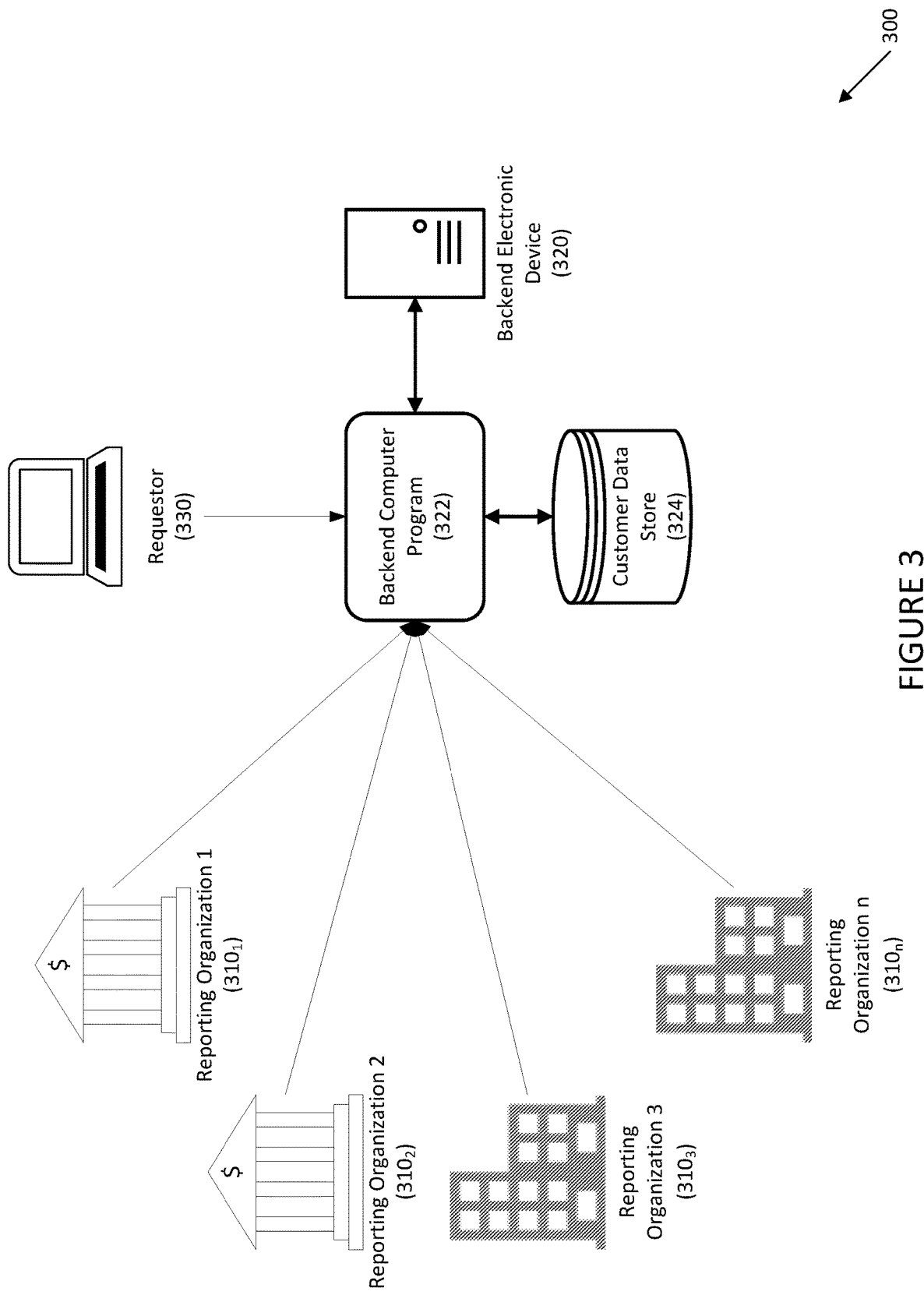
FIG. 3 depicts a system for homomorphic encryption-based scoring according to an embodiment.

Referring to FIG. 3, a system for homomorphic encryption-based scoring is disclosed according to an embodiment. As an illustrative example, financial institutions may encrypt and provide financial records to a credit bureau, and the credit bureau may store the encrypted financial records. When an organization requests a credit check to be run, or a credit score to be calculated, the credit bureau runs the algorithm on the encrypted data. The encrypted result of the operation may be returned the requesting organization, where it may then be decrypted. For example, each organization may decrypt its portion of the result set, and then combine them or a portion of them. An example is disclosed in eprint.iacr.org/2019/524.pdf, the disclosure of which is incorporated, by reference, in its entirety.

Homomorphic encryption and multi-key homomorphic encryption may be used by credit bureaus to calculate a credit score for a customer.

System 300 may include a plurality of reporting organizations (e.g., reporting organization $310_1$, reporting organization $310_2$, reporting organization $310_3$, . . . reporting organization $310_n$) that may provide encrypted customer data to backend computer program 322. Reporting organizations may include any type of organization that may provide relevant data for a customer. For example, in a credit bureau scenario, reporting organizations 310 may include financial institutions, FinTechs, etc. Other reporting organizations 310 may be included as is necessary and/or desired.

Customer data may include financial transactions, including purchases, loans, payments, credit applications, etc.

Reporting organizations 310 may encrypt the customer data with a public key for the backend (e.g., for homomorphic encryption) and/or with their public keys and the public key for the backend (e.g., for multi-key homomorphic encryption), etc.

Backend computer program 322 may executed by backend electronic device 320, which may be any suitable electronic device (e.g., servers (physical and/or cloud-based), computers, etc.). Backend computer program 322 may receive the encrypted customer data from reporting organizations 310 and may store it in customer data store 324.

Requestor 330, which may be one of reporting organizations 310, or a separate individual, organization, etc., may request a score, such as a credit score, for a customer from backend computer program 322. In one embodiment, the customer may be identified using an identifier (e.g., social security number, name, data of birth, combinations thereof, etc.) or using an identifier that anonymously identifies the customer. Backend computer program 322 may retrieve the encrypted customer data and execute an algorithm to generate a score for the customer using the encrypted customer data. It may then return a result, which is also encrypted, to requestor 130. Requestor 330 may then decrypt the encrypted result.

Figure 4:
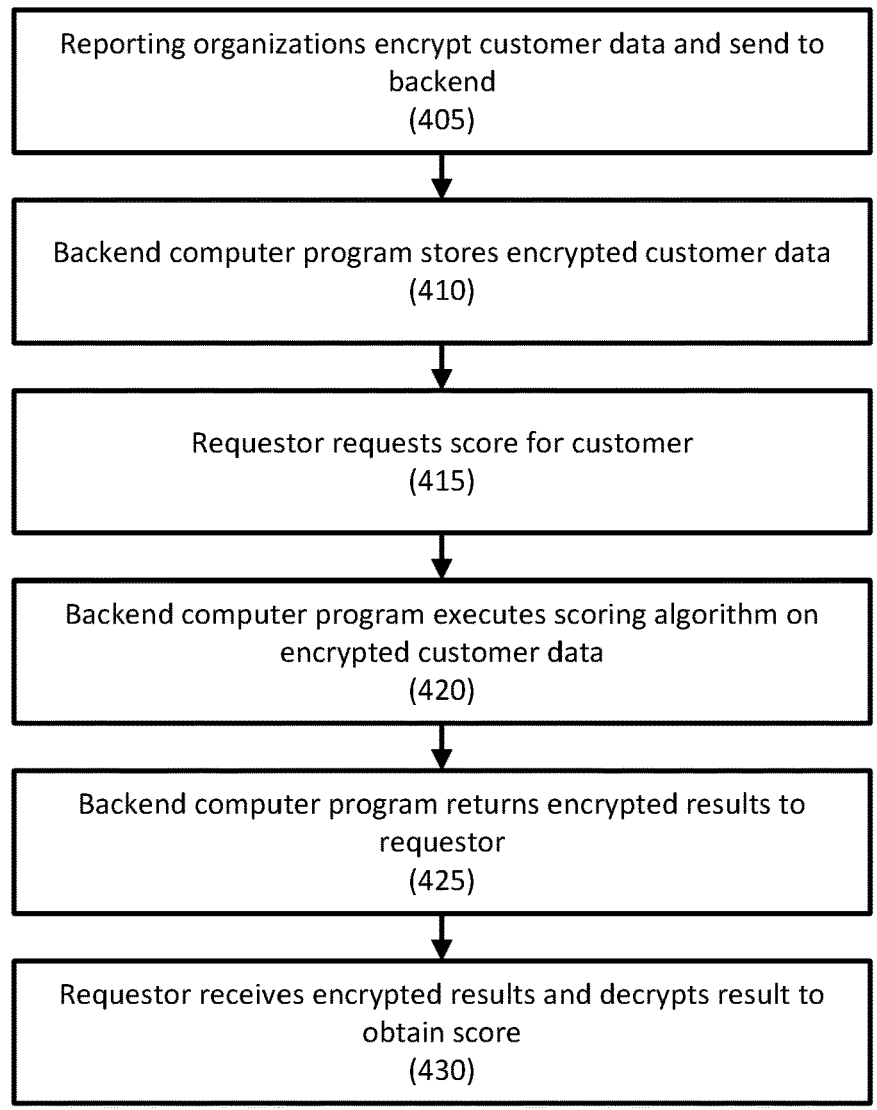
FIG. 4 depicts a method for homomorphic encryption-based scoring according to an embodiment.

Referring to FIG. 4, a method for homomorphic encryption-based scoring is disclosed according to an embodiment.

In step 405, a plurality of reporting organizations may encrypt customer data and may send the encrypted customer data to a backend, such as a credit bureau backend. The encrypted customer data may be associated with a customer identifier (e.g., social security number, name, data of birth, combinations thereof, etc.) or it may be associated with an anonymized backend.

In one embodiment, the customer data may be encrypted with a public key for the backend (e.g., for homomorphic encryption) and/or with their public keys and the public key for the backend (e.g., for multi-key homomorphic encryption), etc.

In one embodiment, the customer identifier(s) may be encrypted with the customer data.

In step 410, a backend computer program may store the encrypted customer data in a database.

In step 415, a requestor, which may be one of the reporting organizations, may request a score for a customer using, for example, the customer identifier. The customer identifier may be encrypted.

In one embodiment, the score may be a credit score.

In step 420, the backend computer program may retrieve the encrypted customer data for the customer identifier (which may be encrypted) and may execute a scoring algorithm on the encrypted customer data to generate an encrypted result.

In step 425, the backend computer program may return the encrypted result to the requestor, and in step 430, the requestor may receive the encrypted results and may decrypt the result to obtain the score.

Figure 5:
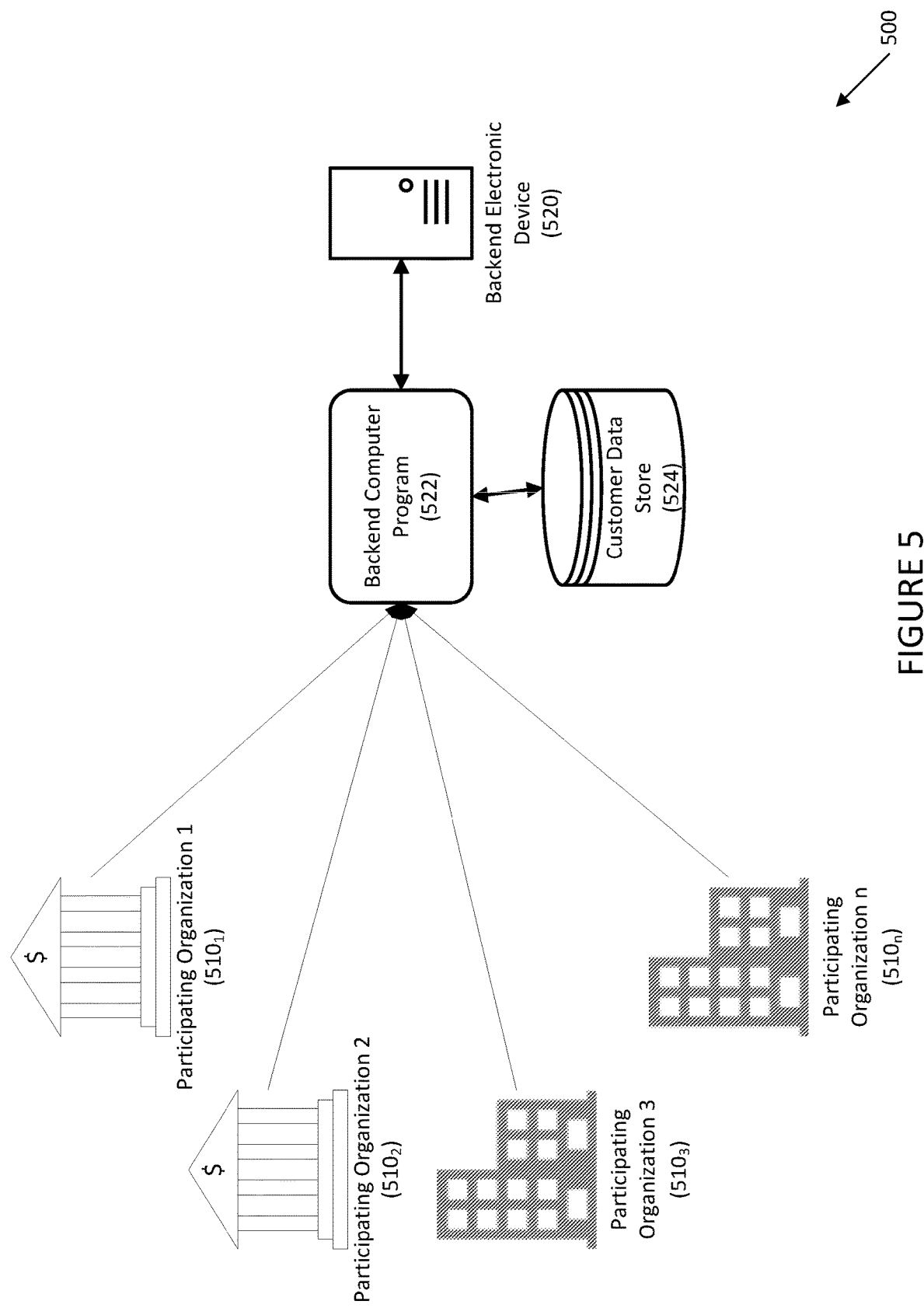
FIG. 5 depicts a system for homomorphic encryption-based fraud identification according to an embodiment.

Referring to FIG. 5, a system for homomorphic encryption-based fraud identification is disclosed according to an embodiment. As an illustrative example, a group of organizations, such as financial institutions, may use homomorphic encryption or multi key homomorphic encryption to identify potential fraud or money laundering. Each financial institution may provide detailed encrypted transactions to a consortium, third party, etc. for processing against a set of machine learning or other processes or algorithms to identify systemic fraud, money laundering activities, etc. The benefit is that the transactions with multiple financial institutions may be used without any financial institution having to provide transaction information in an unencrypted format. The result may be a Boolean value (e.g., true/false, yes/no, fraud/no fraud, etc., a score (e.g., a percent likelihood of fraud), etc.

System 500 may include a plurality of participating organizations (e.g., participating organization $510_1$, participating organization $510_2$, participating organization $510_3$, . . . participating organization $510_n$) that may provide encrypted customer data to backend computer program 522. Participating organizations may include any type of organization that may provide relevant data for a customer. For example, in a credit bureau scenario, participating organizations 510 may include financial institutions, FinTechs, etc. Other participating organizations 510 may be included as is necessary and/or desired.

Customer data may include financial transactions, including purchases, loans, payments, credit applications, etc. In one embodiment, the customer may be identified using an identifier (e.g., social security number, name, data of birth, combinations thereof, etc.) or using an identifier that anonymously identifies the customer.

Participating organizations 510 may encrypt the customer data with a public key for the backend (e.g., for homomorphic encryption) and/or with their public keys and the public key for the backend (e.g., for multi-key homomorphic encryption), etc.

Backend computer program 522 may executed by backend electronic device 520, which may be any suitable electronic device (e.g., servers (physical and/or cloud-based), computers, etc.). Backend computer program 522 may receive the encrypted customer data from participating organizations 510 and may store it in customer data store 524.

Backend computer program 522 may apply a set of machine learning or other processes or algorithms to the encrypted customer data to identify systemic fraud, money laundering activities, etc. It may then return a result, such as a Boolean value (e.g., true/false, yes/no, fraud/no fraud, etc., a score (e.g., a percent likelihood of fraud), to participating organizations 510.

The backend may be for one of participating organizations 510, a FinTech, a separate service provider, etc.

Figure 6:
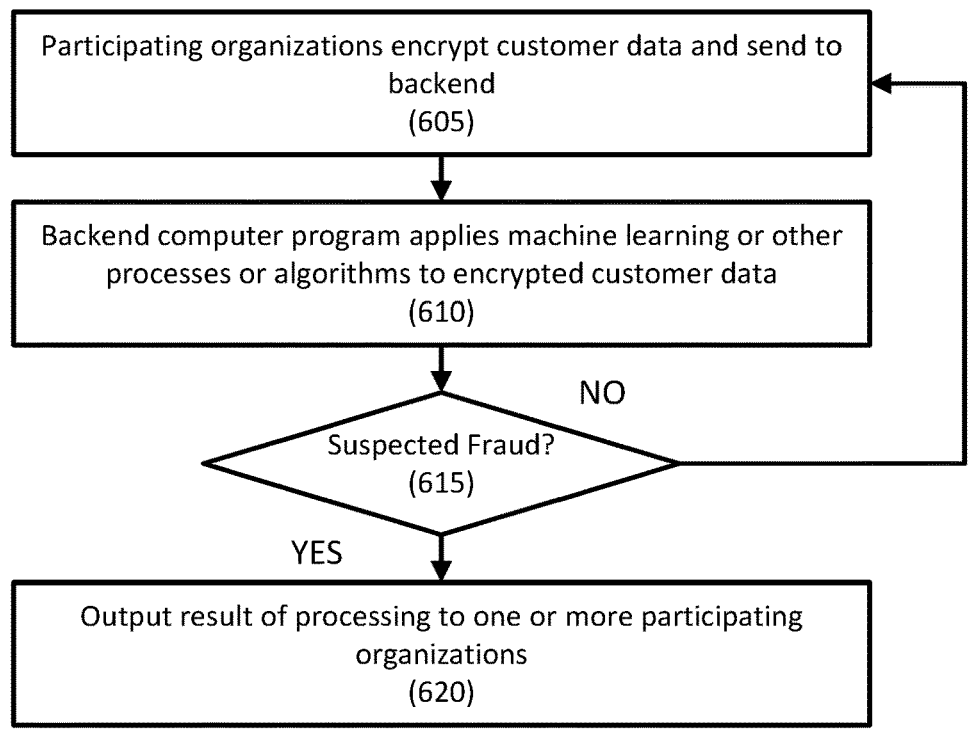
FIG. 6 depicts a method for homomorphic encryption-based fraud identification according to an embodiment.

FIG. 6 depicts a method for homomorphic encryption-based fraud identification according to an embodiment. For example, a backend may provide fraud detection as a service.

In step 605, one or more of a plurality of participating organizations may encrypt customer data and may send the encrypted customer data to a backend. The backend may be for one of the participating organizations, for a FinTech, for a separate service provider, etc.

In one embodiment, the encrypted customer data may be for a financial transaction for which the participating financial institution requests a fraud assessment.

In step 610, a backend computer program for the backend may apply a machine learning or other processes or algorithms to the encrypted customer data. The processing may result in an indication that the encrypted customer data is indicative of fraud.

If step 615, the backend computer program determines that there is a likelihood of fraud (e.g., the processing indicates fraud, a score above a threshold, etc.), in step 620, the backend computer program may output the result to one or more of the participating organizations. In one embodiment, any customer identifier in the result may be replaced with a value, such as a token or grouping value, to hide the customer's identity.

Figure 7:
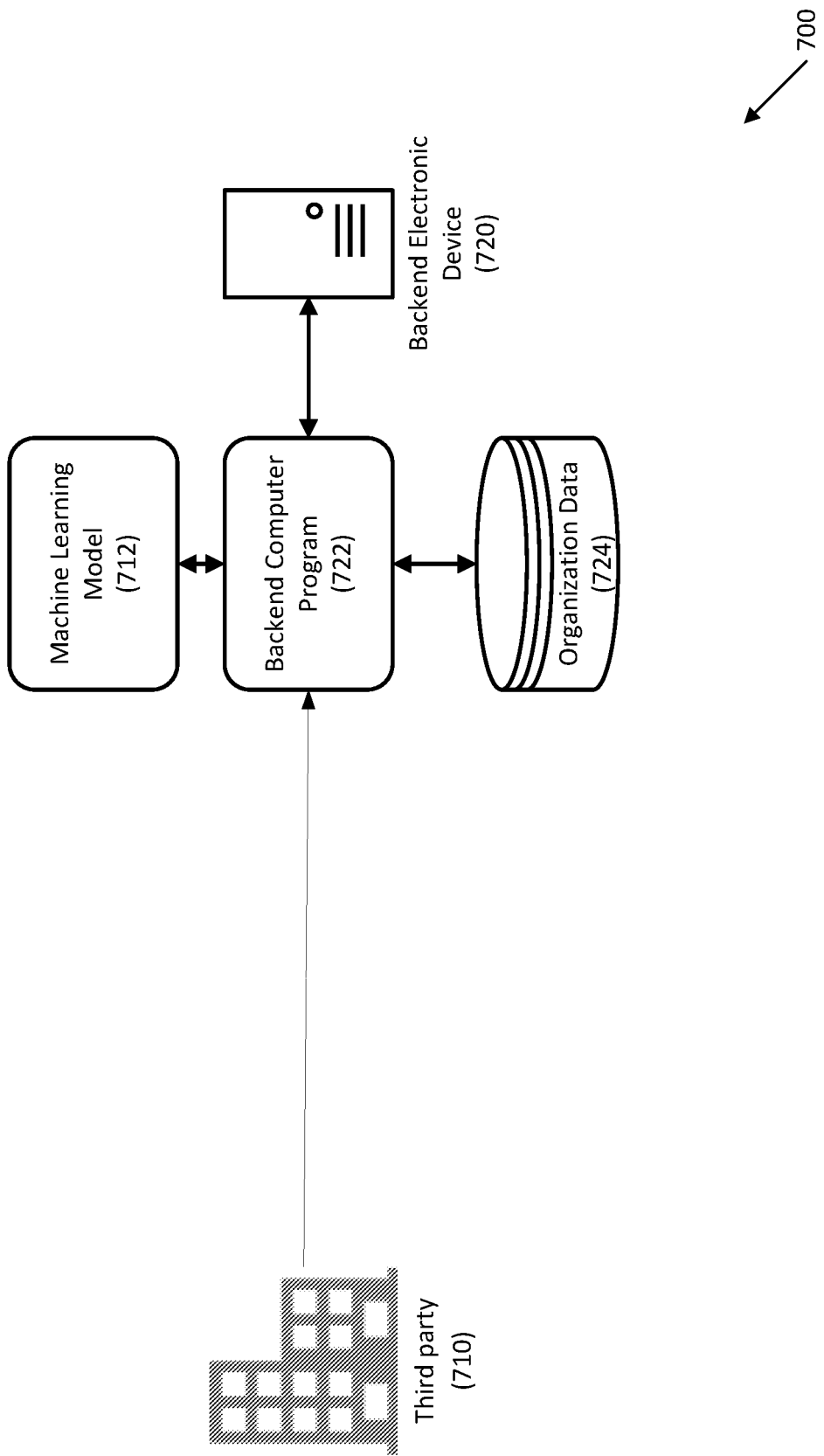
FIG. 7 depicts a system for homomorphic encryption-based collaborative machine learning according to an embodiment.

Referring to FIG. 7, a system for homomorphic encryption-based collaborative machine learning is disclosed according to an embodiment. As illustrative example, an organization may provide a collaborative machine learning environment where other organizations, merchants, partners and customers may design, train, and run machine learning algorithms without having direct access to the organization's data. System 700 may include backend electronic device 720 for the organization that may execute backend computer program 722 that may receive machine learning model 712 from third party 710, and may train machine learning model 712 using training data. The organization may then run the trained machine learning model 712 using homomorphic encrypted data, such as organization data 724. The results of execution may be returned to third party 710. The organization's data is not exposed or revealed to the third party.

In one embodiment, third party 732 may provide machine learning model 712 in an encrypted state and machine learning model 712 may be run against a set of data (e.g., organization data 724) that is also encrypted. Depending on the data, multiple keys may be used to keep all data safe, or a single public key may be used by all.

Figure 8:
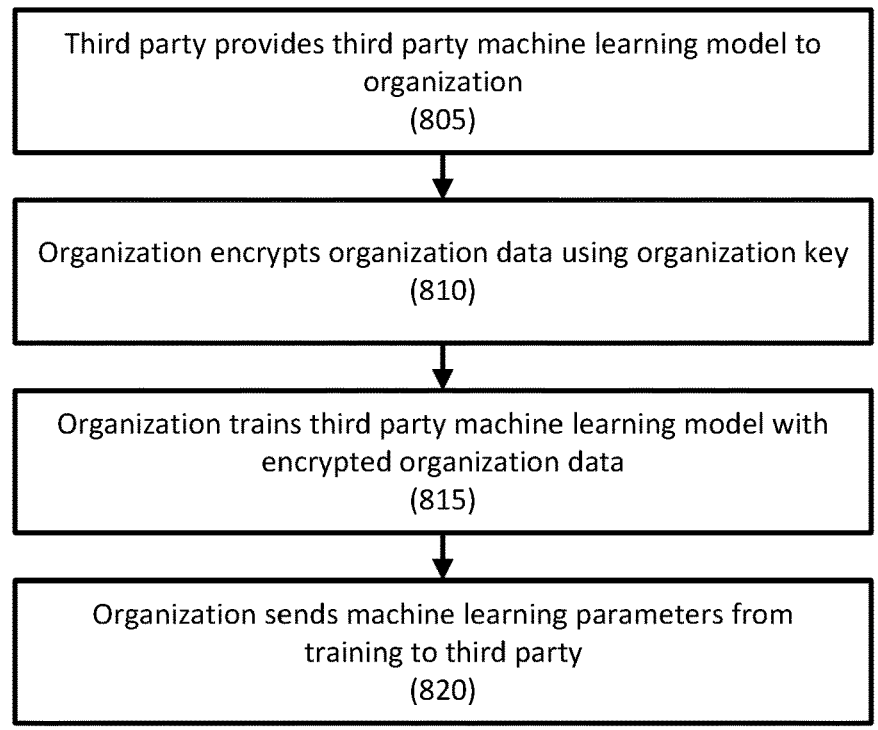
FIG. 8 depicts a method for homomorphic encryption-based collaborative machine learning according to an embodiment.

FIG. 8 depicts a method for homomorphic encryption-based collaborative machine learning according to an embodiment.

In step 805, a third party may provide an organization with a third party machine learning model to train.

In step 810, a computer program for the organization may encrypt organization data using an organization key, such as a public key.

In step 815, the computer program for the organization may train the third party machine learning model with the encrypted organization data.

In step 820, the computer program may send the parameters, such as weights, for the trained machine learning model to the third party.

Figure 9:
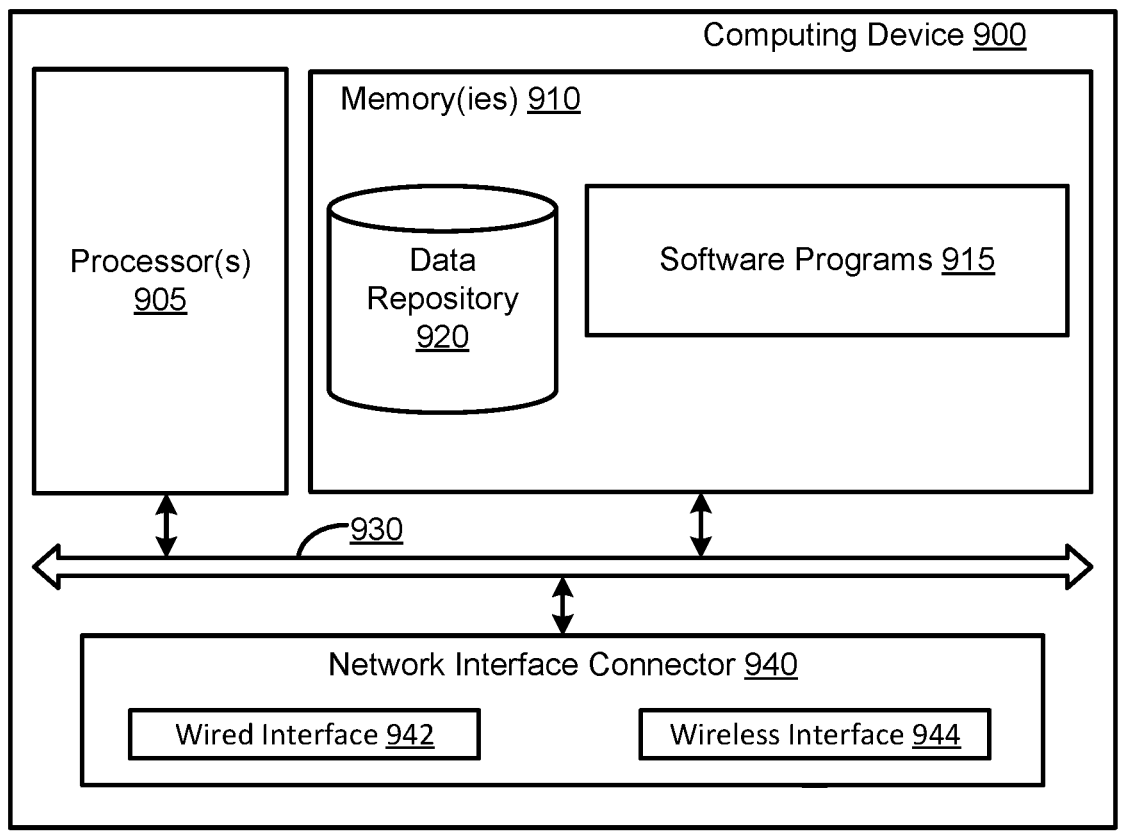
FIG. 9 depicts an exemplary computing system for implementing aspects of the present disclosure.

FIG. 9 depicts an exemplary computing system for implementing aspects of the present disclosure. FIG. 9 depicts exemplary computing device 900. Computing device 900 may represent the system components described herein. Computing device 900 may include processor 905 that may be coupled to memory 910. Memory 910 may include volatile memory. Processor 905 may execute computer-executable program code stored in memory 910, such as software programs 915. Software programs 915 may include one or more of the logical steps disclosed herein as a programmatic instruction, which may be executed by processor 905. Memory 910 may also include data repository 920, which may be nonvolatile memory for data persistence. Processor 905 and memory 910 may be coupled by bus 930. Bus 930 may also be coupled to one or more network interface connectors 940, such as wired network interface 942 or wireless network interface 944. Computing device 900 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
   receiving, by a backend computer program executed by a backend electronic device and from a distributed ledger, a trigger condition for an event, the trigger condition homomorphically encrypted with a public key for an organization and an action to be executed in response to the trigger condition being met;
   receiving, by the backend computer program, a stream of data homomorphically encrypted with the public key;
   comparing, by the backend computer program, the homomorphically encrypted trigger condition to the homomorphically encrypted stream of data;
   determining, by the backend computer program and based on the comparison, that the trigger condition is met; and
   executing, by the backend computer program, the action associated with the trigger condition.

2. The method of claim 1, wherein the encrypted trigger condition comprises the action, and further comprising:
   decrypting, by the backend computer program, the action using a private key corresponding to the public key.

3. The method of claim 1, wherein the action is separate from and associated with the homomorphically encrypted trigger condition.

4. The method of claim 2, wherein the action is homomorphically encrypted with the public key, and further comprising:
   decrypting, by the backend computer program, the action using a private key corresponding to the public key.

5. The method of claim 1, wherein the trigger condition and the stream of data are further homomorphically encrypted with a public key for a client.

6. The method of claim 5, wherein the action is homomorphically encrypted with the public key for the client or the public key for the organization.

7. The method of claim 6, further comprising:
   decrypting, by the backend computer program, the action with a private key corresponding to the public key for the client or a private key corresponding to the public key for the organization.

8. A system, comprising:
   a client device executing a client computer program;
   a backend electronic device for an organization executing a backend computer program;
   a distributed ledger storing homomorphically encrypted trigger conditions; and
   a streaming data source;
   wherein:
      the client computer program homomorphically encrypts a trigger condition for an event with a public key for an organization;
      the client computer program sends the homomorphically encrypted trigger condition and an action to be executed in response to the trigger condition being met to the distributed ledger;
      the backend computer program receives a stream of data from the streaming data source;
      the backend computer program receives the homomorphically encrypted trigger condition from the distributed ledger;
      the backend computer program homomorphically encrypts the stream of data with the public key for the organization;
      based on the comparison, the backend computer program compares the homomorphically encrypted trigger condition to the homomorphically encrypted stream of data;
      the backend computer program determines that the trigger condition is met; and
      the backend computer program executes the action associated with the trigger condition.

9. The system of claim 8, wherein the homomorphically encrypted trigger condition comprises the action, the backend computer program decrypts the action using a private key corresponding to the public key.

10. The system of claim 8, wherein the action is separate from and associated with the homomorphically encrypted trigger condition.

11. The system of claim 9 wherein the action is homomorphically encrypted with the public key, and the backend computer program decrypts the action using a private key corresponding to the public key.

12. The system of claim 8, wherein the trigger condition and the stream of data are further homomorphically encrypted with a public key for the client.

13. The system of claim 12, wherein the action is homomorphically encrypted with the public key for the client or the public key for the organization.

14. The system of claim 13, wherein the backend computer program decrypts the action with a private key corresponding to the public key for the client or a private key corresponding to the public key for the organization.

15. A non-transitory computer readable storage medium, including instructions stored thereon, which when read and executed by one or more computer processors, cause the one or more computer processors to perform steps comprising:
receiving, from distributed ledger, a trigger condition for an event, the trigger condition homomorphically encrypted with a public key for an organization, and an action to be executed in response to the trigger condition being met;
receiving a stream of data homomorphically encrypted with the public key;
comparing the homomorphically encrypted trigger condition to the homomorphically encrypted stream of data;
based on the comparison, determining that the trigger condition is met; and
executing the action associated with the trigger condition.

16. The non-transitory computer readable storage medium of claim 15, wherein the homomorphically encrypted trigger condition comprises the action, and further including instructions stored thereon, which when read and executed by one or more computer processors, cause the one or more computer processors to decrypt the action using a private key corresponding to the public key.

17. The non-transitory computer readable storage medium of claim 15, wherein the action is separate from and associated with the homomorphically encrypted trigger condition.

18. The non-transitory computer readable storage medium of claim 16, wherein the action is homomorphically encrypted with the public key, and further including instructions stored thereon, which when read and executed by one or more computer processors, cause the one or more computer processors to decrypt the action using a private key corresponding to the public key.

19. The non-transitory computer readable storage medium of claim 15, wherein the trigger condition and the stream of data are further homomorphically encrypted with a public key for a client.

20. The non-transitory computer readable storage medium of claim 19, wherein the action is homomorphically encrypted with the public key for the client or the public key for the organization, and further including instructions stored thereon, which when read and executed by one or more computer processors, cause the one or more computer processors to decrypt the action with a private key corresponding to the public key for the client or a private key corresponding to the public key for the organization.

* * * * *